J. H. GLAUBER.
BASIN, BATH COCK, AND OTHER PLUMBING CONNECTION.
APPLICATION FILED MAR. 10, 1911.
1,109,920.
Patented Sept. 8, 1914.
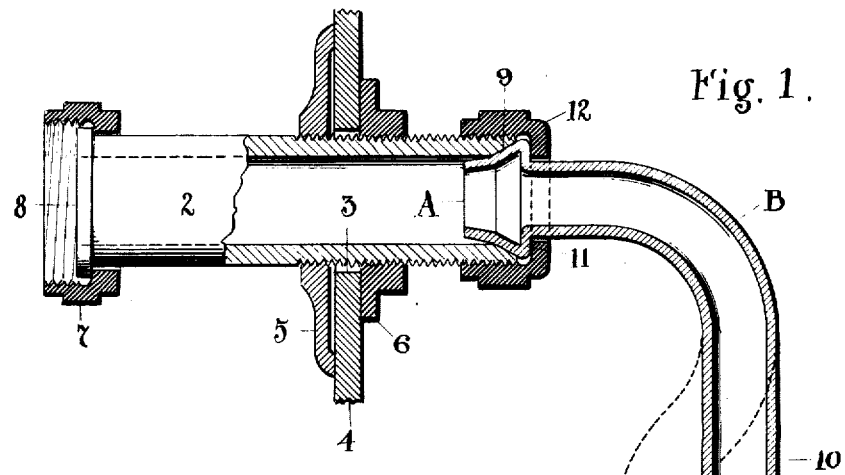
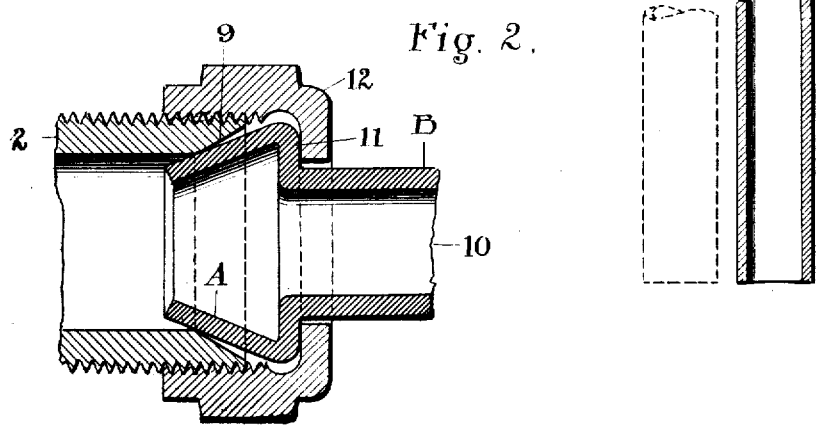
ATTEST.
INVENTOR.
Joseph H. Glauber,
By Fisher & Moser, Attys

UNITED STATES PATENT OFFICE.

JOSEPH H. GLAUBER, OF CLEVELAND, OHIO.

BASIN, BATH-COCK, AND OTHER PLUMBING CONNECTION.

1,109,920.  Specification of Letters Patent.  Patented Sept. 8, 1914.

Application filed March 10, 1911. Serial No. 613,610.

*To all whom it may concern:*

Be it known that I, JOSEPH H. GLAUBER, citizen of the United States, residing at Cleveland, in the county of Cuyahoga and State of Ohio, have invented certain new and useful Improvements in Basin, Bath-Cock, and other Plumbing Connections, of which the following is a specification.

My invention relates to basin, bath cock, and other plumbing connections, and comprises an improved coupling member having a hollow metallic tapering head substantially as herein shown and described and more particularly pointed out in the claims.

Briefly reviewing present conditions, I am aware of the existence of coupling members having solid tapering heads, and also others which are provided with separate removable cone-shaped gaskets of solid rubber, lead or the like. Now in actual practice it is not always permissible or practicable to use solid rubber gaskets or separate solid gaskets of any kind, as builders' specifications or some particular need demand an integral construction and metal to metal seating of the coupling members, and therefore the coupling members having unyielding heads of solid metal have heretofore been specified and employed. These solid metal heads are of varying tapers but the practice is to mate them with the tapered seats in the shanks of bath or basin cocks, which shanks are generally made of cast metal. In view of these facts and that different parts of the coupling are sold as separate articles of manufacture by many different manufacturers—consequently varying materially in size, form and construction—imperfect and defective connections are often the result. One serious trouble met with by plumbers is the splitting of the tapered end of the cast shanks and resultant leakage when a tapered solid-metal head is drawn up too tightly therein. Stripping of the threads on the outside of the shank or in the coupling-nut is also a constant occurrence, particularly when too great a seating resistance is offered during coupling operations.

Now, therefore, my object is to provide a coupling member in which all the strength, durability, permanency and advantage of a solid metallic coupling head is combined with all the flexibility and universal applicability of a rubber or other yielding gasket; but eliminating the disadvantages and objectionable features of both constructions as made and used heretofore.

In other words, I aim to meet a pressing and evergrowing need by furnishing the trade and the public with a coupling member having a hollow tapered metallic head particularly constructed to yield under pressure without rupture so as to conform with the different beveled seats of the shanks of different manufacturers. Splitting of the shank-end and stripping of the threads is thereby prevented and any variation between different makes of coupling members is also taken up,—making a perfectly secure and efficient fluid-tight connection adapted to withstand a high test without the aid of gaskets of any description and giving a wide range of service with any kind of fluid—hot or cold, chemical, gaseous, or those deleterious in quality or action. Simplicity of construction and durability are in fact marked features of my improved coupling member.

In the accompanying drawings, Figure 1 is a sectional elevation of one form of my improved coupling member attached to a bath-cock shank showing the hollow head contracted to conform with the tapered seat in the shank, and Fig. 2 is an enlarged sectional view illustrating the relation of the parts and form of the head before contraction takes place.

Now referring to Fig. 1, tubular member 2 shown therein represents one form of bath-cock shank in general use, and this shank 2 projects through an opening 3 in wall 4 of the bathtub and is fastened in place by a nickel-plated screw flange 5 located upon the inside of the tub and by a detachable screw collar 6 on the outside. The faucet or cock (not shown) is secured to member 2 by nut 7 engaged with end flange 8, and the opposite end of the shank member is tapered internally to provide a flaring seat 9 for a conical sealing head A either integral with or a separate fixed part of a tubular body 10. These two parts taken together constitute a single unitary coupling member B adapted to be sold as a separate article of manufacture for use with the shank described or with an equivalent member.

In practice, head A is detachably connected with the shank, and the opposite end of coupling member B is attached— either adjustably, detachably, or permanently—to a supply or service pipe more or less distantly located from the shank. Therefore, body 10 is preferably made of bendable metal to permit hand bending and deflection of coupling member B in making attachments—head A, however, always sustaining axial alinement with shank 2. This form of an all-metal coupling member A is shown in Fig. 1, wherein the walls of both body 10 and head A are of uniform thickness and annealed to give the required effects. In fact, coupling member B is preferably made of drawn tubing, annealed throughout, to provide a yieldable contractible cone head A and a bendable stem or body 10,—a one piece construction without joints end to end.

As shown in Figs. 1 and 2, head A is tapered and hollow, or conical, and its truncated end is approximately of the same diameter as body 10. The enlarged portion of head A is formed by developing an annular shoulder 11 about body 10 at right angles to the axis thereof, and this shoulder is stiffened or braced by the tapering wall of the cone where merged therewith at the bend, making a strong and rigid thrust-bearing for flanged coupling nut 12 wherewith draw connection is made with shank 2. The taper of head A is preferably on more acute lines than the average taper found in seat 9 of the shanks in general use, which difference in construction causes an initial seating engagement forwardly on the head when it is first introduced into the shank. In this relationship the tapered seat 9 in the shank at the beginning of operations is also engaged inwardly at its smallest diameter opposite the thickest or heaviest portion of the shank-end (see Fig. 2,) and therefore, when coupling nut 11 is screwed up, head A will be forcibly carried forward and contracted to conform to the taper of seat 9 (see Fig. 1). This result would not readily follow unless head A was conical and made of ductile metal; nor would such seating always result without rupture of head A or splitting of the shank-end if both parts were solid and unyielding. In expanding operations to form head A integrally with body 10 the walls of said head may become thinner, but this is of advantage rather than otherwise as head A is particularly designed to have more yield and give than the body. In fact, if heavy metal is used, the tapering wall of the head may be materially reduced in thicknesses by lathe or other operations. On the other hand, total collapse of head A is also a contingency to be considered, walls of very thin material being impracticable for this reason. In this connection it must also be remembered that coupling member B is subjected to internal pressures, and that body 10 must necessarily be heavy enough to meet these requirements, particularly between its ends where not reinforced or inclosed by other parts. Initial engagement between conical seat 9 and cone head A where truncated assists materially in preventing splitting of the shank-end because the thickest or heaviest portion of said shank is first to bear the brunt of the compressive strains, and for the further reason that head A will be the first to yield—being made of lighter or of softer material than the shank which is generally of cast metal. The best of sealing effects is also obtained by this combination of a conical head made of tough, tenacious and yieldable metal, with a tapered shank-end of cast metal, as any roughness or irregularity in the harder metal will be accommodated in the softer and more pliable one.

Tubular body 10 of coupling member B is shown of the same diameter throughout, although this is optional in view of known forms having different diameters, particularly at opposite ends. Many coupling members are of the form illustrated—bent at right angles with straight short and long stems. Some are straight end to end,—others have a double bend therein; but inasmuch as these features are old and well known and do not affect my invention, further disclosure and reference thereto is omitted.

What I claim is:

1. As a new article of manufacture and sale, a tubular coupling pipe of pliant metal having an acute-angled truncated head formed from the wall thereof at one end, said head being of relatively greater diameter than the pipe to form a right-angled shoulder for a union nut and having a converging portion of uniform thickness extending on straight lines at an angle of approximately twenty-two and one-half degrees to the axis of the pipe from the outside diameter of said shoulder to a smaller diameter than the smallest internal diameter of the inner edge of the tapered seat of the cast metal faucet shanks in general use so as to provide an initial seating engagement of the truncated portion of the head with said edge at a point directly opposite the thick portion of the shank end.

2. In a plumbing connection adapted to be used between a service pipe and a faucet, a tubular shank having an internally-tapered end providing a flaring seat with an annular sharp edge inwardly from its extremity, in combination with a tubular coupling member having separate coupling ends, one of which comprises a hollow truncated acute-angled cone having a right-angled base wall to provide an annular angular shoulder about said member and a side wall of substantially uniform thickness converging forwardly on straight lines at an angle of approximately twenty-two and one-half degrees to the axis of said member and providing a yielding body of greater diameter than said tubular member and of extended length and of smaller diameter at its end than said shank internally at the inner sharp edge of its tapering seat, and means to forcibly couple said shank and member together.

3. In a plumbing connection, the combination of a tubular threaded shank for a faucet or other water distributing device, having an internal flaring seat at one end, and a union nut, with a coupling tube for a service pipe, made of pliant metal with one end thereof expanded to a relatively greater diameter in the form of an annular right-angled shoulder and an annular converging portion of substantially uniform thickness extending on straight lines externally and internally from the outer portion of said shoulder to a smaller diameter of relatively the same diameter as said tube, the degree of angle of said converging portion being relatively acute to the axis of the pipe and said portion being also relatively long to make an initial seating engagement with said flaring shank seat inwardly from its extremity and providing a contractible extension to permit the said coupling tube end to project into the main bore of said shank beyond the smallest diameter of said flaring seat when the parts are coupled together with the union nut screwed to its limit.

In testimony whereof I affix my signature in presence of two witnesses.

JOSEPH H. GLAUBER.

Witnesses:
R. B. MOSER,
F. C. MUSSEM.

It is hereby certified that in Letters Patent No. 1,109,920, granted September 8, 1914, upon the application of Joseph H. Glauber, of Cleveland, Ohio, for an improvement in "Basin, Bath-Cock, and Other Plumbing Connections" errors appear in the printed specification requiring correction as follows: Page 2, lines 107-109, strike out the words "at an angle of approximately twenty-two and one-half degrees" and insert the words *at a relatively acute angle;* same page, line 130, and page 3, lines 1-2, strike out the words "at an angle of approximately twenty-two and one-half degrees to the axis of said member" and insert the words *at a relatively acute angle to the axis of the pipe;* and that the said Letters Patent should be read with these corrections therein that the same may conform to the record of the case in the Patent Office.

Signed and sealed this 20th day of October, A. D., 1914.

[SEAL.]

J. T. NEWTON,
*Acting Commissioner of Patents.*